(12) United States Patent
Heffernan et al.

(10) Patent No.: US 9,854,925 B2
(45) Date of Patent: Jan. 2, 2018

(54) HOME BAKING KIT WITH COMPUTER INTERFACE

(71) Applicant: Machinery Verification & Documentation Service Inc., Setauket, NY (US)

(72) Inventors: John Heffernan, Setauket, NY (US); Neil P. Heffernan, Setauket, NY (US); Andrew J. Heffernan, Brightwaters, NY (US)

(73) Assignee: Machinery Verification & Documentation Service Inc., Setauket, NY (US)

(*) Notice: Subject to any disclaimer, the term of this patent is extended or adjusted under 35 U.S.C. 154(b) by 0 days.

(21) Appl. No.: 14/990,043

(22) Filed: Jan. 7, 2016

(65) Prior Publication Data

US 2016/0192790 A1     Jul. 7, 2016

Related U.S. Application Data

(63) Continuation-in-part of application No. 13/718,340, filed on Dec. 18, 2012, now abandoned.
(Continued)

(51) Int. Cl.
*A47F 10/02*     (2006.01)
*G06Q 20/18*     (2012.01)
(Continued)

(52) U.S. Cl.
CPC .............. *A47F 10/02* (2013.01); *G06Q 20/18* (2013.01); *G07F 13/06* (2013.01); *G07F 17/0078* (2013.01)

(58) Field of Classification Search
CPC ........ A47F 3/04; A47F 3/0439; A47F 3/0452; A47F 3/0491; A47F 3/0465; A47F 11/00;
(Continued)

(56) References Cited

U.S. PATENT DOCUMENTS 5,822,216 A * 10/1998 Satchell, Jr. ............ G06Q 20/20
                                                                       700/232
6,587,835 B1 * 7/2003 Treyz ..................... G06Q 20/12
                                                                       705/14.64
(Continued)

*Primary Examiner* — Timothy R Waggoner
(74) *Attorney, Agent, or Firm* — Alfred M. Walker

(57) ABSTRACT

A new range of ready to use home baking products, measured and proportioned, is provided for selection of the required ingredients for the type of cake required and bake. The general idea is that home bakers, without any special baking experience, knowledge or commercial baking background can bake professional tasting cake. The range contains unique concepts which are embodied in the kiosk and associated displays, which include pour and bake batter, dry cake mixes, Danish pastry dough, filling, toppings, icing, fondant and all the other typical ingredients necessary needed and involved in home cake baking, similar to the range of fresh baked commercial available goods. One stop shopping is provided in a kiosk, where not only are all the ingredients available but where the home baker can interface with a baking company's logo and computer display and vending of products for all the various information one may need.

16 Claims, 12 Drawing Sheets

Related U.S. Application Data

(60) Provisional application No. 61/630,776, filed on Dec. 19, 2011.

(51) Int. Cl.
*G07F 13/06* (2006.01)
*G07F 17/00* (2006.01)

(58) Field of Classification Search
CPC .......... A47F 10/02; G07F 9/105; G07F 11/70; G06Q 20/08
USPC .................................... 312/116, 117; 186/52
See application file for complete search history.

(56) References Cited

U.S. PATENT DOCUMENTS

| | | | | |
|---|---|---|---|---|
| 8,744,618 | B2* | 6/2014 | Peters | B67D 1/0041 700/236 |
| 2003/0204289 | A1* | 10/2003 | Banerjee | G06Q 50/188 700/241 |
| 2004/0169048 | A1* | 9/2004 | Simmons | G07F 9/105 221/92 |
| 2006/0259190 | A1* | 11/2006 | Hale | G06Q 10/06311 700/234 |
| 2008/0249883 | A1* | 10/2008 | Daily | A47F 9/047 705/23 |
| 2013/0290068 | A1* | 10/2013 | Sobecks | G07F 9/02 705/7.29 |

* cited by examiner

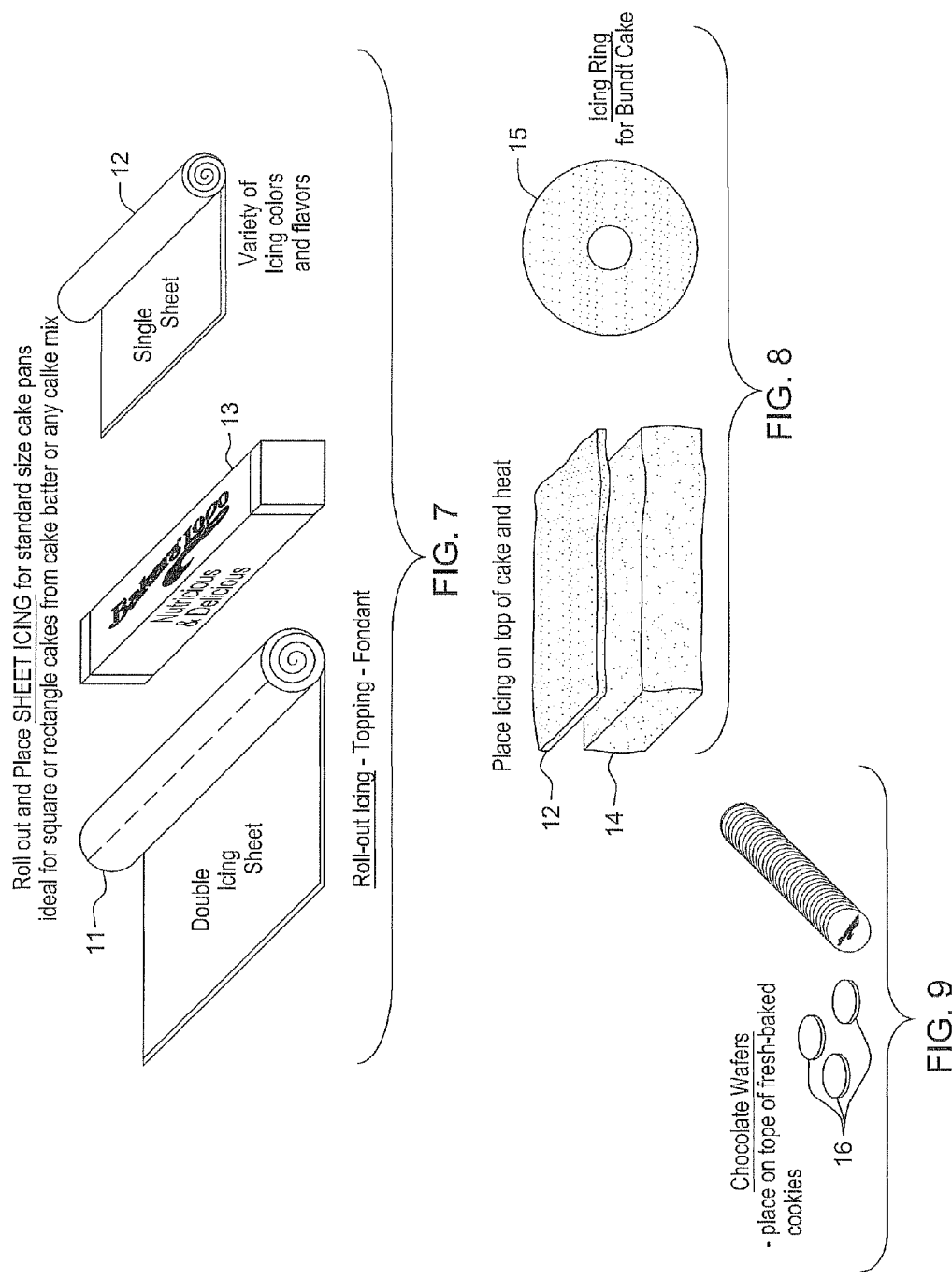

HOME BAKING KIT WITH COMPUTER INTERFACE

RELATED APPLICATIONS

This application is a continuation-in-part of application Ser. No. 13/718,340 filed Dec. 18, 2012, which '340 application is incorporated by reference herein, Applicants claim priority in part from the '340 application under 35 USC section 120 therefrom. The '340 application is based upon Provisional Application No. 61/630,776, filed Dec. 19, 2011, which '776 application is incorporated by reference herein. Applicant claims priority under 35U.S.C. 119 (e) therefrom.

FIELD OF THE INVENTION

The present invention relates to the introduction of convenient ready to use cake mixes, batter, fillings, toppings, icing, fondant, glazes, etc. in tangible dispensing containers displayed in a shelving display kiosk associated with a baking company's logo. The inclusion of a customer interface with an in store computer at the kiosk for all baking knowledge, information and instructions enables the home baking customer to select what type of baking products needed, either from instructions displayed on the kiosk's computer screen or on the customer's own cell phone screen, and which particular different ingredient components are needed to select from three temperature associated displays constructed to form the kiosk in a supermarket or other retail food establishment. The computer applications (i.e. "Apps") and other software associated with the computer, the kiosk and the customer's Internet-enabled portable or home PC computer, can also instruct the customer in combining, mixing, blending and baking the desired cake or other bakery product at home, and supply the customer with premeasured quantities of the requested ingredient components.

SUMMARY OF THE INVENTION

The coordinated interchangeable baking kit system, can be accessed by a customer and the information required can be downloaded to a handheld device, such as a cell phone or other portable electronic computing device (having Internet-enabled software applications known as "Apps"), e-mailed to home computer, or other Internet-enabled implement. Computer print outs, with audio and/or visual instruction are also available from a printer at the kiosk. The kiosk can also refer the customer to the baking company's website, so that the customer can access information related to the kiosk remotely, if the customer is using a remote shopping website (i.e. PeaPod®) so that the user can have remote home delivery of the packaged baking components available at the baking company's kiosk. The system can also vend the required baking constituent components to the user for delivery or for in-store pickup by the customer.

A unique feature of the concept is the interaction between the customer and the computer of the bakery manufacturer and/or supermarket having the kiosk, via the computer. The kiosk's computer will respond to prompts, to questions from the customer's handheld computer (i.e. "smart phone" or other hand held portable electronic device that is Internet-enabled) or from the kiosk's interactive computer displays. Illustrations or media such as photographs and/or videos showing preparation of home baking products, ingredients and baking steps provide screen viewable images and/or print out directions on how to bake the requested product associated with the baking company's logo.

Ingredient quantity information and/or a set of instructions for a specific baking product, such as, for example, baking times, required baking temperatures and mixing requirements for baking a pound cake, birthday cake with icing, special flavored cheese cake or cherry cheese Danish pastry, for example, can be downloaded from the kiosk's computer, or via the Internet to the customer's handheld computer, such as a cell phone, smart phone, laptop, tablet/pad or other personal electronic device which is Internet-enabled.

Displayed in the in-store "Kiosk Style Display" (shown in FIG. 12) within the supermarket or other retail food establishment is the baking company logo (shown in FIG. 1) and the complete range of tangible container packages of specific baking ingredients required for home baking. Coupled with an interactive touch screen display (or other input device such as a keyboard or mouse, upon the kiosk's computer (shown in FIGS. 12A and 14), by which the customer can get all the necessary information and instructions for home baking, the kiosk display also includes three or more temperature controlled sections, which may be linked together, armoire furniture style, opposite each other (as shown in FIG. 12) or other convenient furniture or shelving arrangement that allows the customer access to the product displays and which incorporates the baking company's computer.

In a further embodiment, the kiosk includes a means for physically vending the baking ingredient constituent products via a gantry merchandise procurement device for moving selected shopping products from one location to another, such as disclosed in U.S. Pat. No. 6,962,267 of Herzog.

The three or more sections include at least the following:

a) a room temperature display section (labeled "Dry Goods" in FIG. 12) for container packages of dry ingredients, typically cake mixes, crumbs, sealed toppings, coconut flakes, chocolate chips and flakes, dry fruit, raisins, nuts etc.;

b) a refrigeration display section (labeled "Cold" in FIG. 12) for liquid cake batter cartons, liquid donut batter cartons, liquid chocolate cake batter cartons, glazes, toppings, liquid eggs, egg wash containers, liquid banana containers, liquid banana, other typical ingredients requiring refrigeration at about 40° or less; and, c) a frozen display section (labeled "Frozen" in FIG. 12") for frozen Danish pastry dough, pie dough, pie filling fruit in syrup, apple cherry, cheese, crushed pineapple, etc., butter, margarine, baking fats, other typical baking ingredients requiring refrigeration, below freezing, such as about 20° F. to about minus 15° F.

While using the kiosk or handheld personal electronic device with an appropriate "App", i.e. the software application, the home baker customer selects a set of the desired quantity of tangible packages of baking ingredients required to bake the type of cake to be baked. These containers can be rectangular boxes with hingably openable tops with slits and flaps, such as shown in FIG. 2 and FIG. 4, rectangular milk carton type boxes with pourable tops, such as shown in FIG. 3 and FIG. 6, cylindrical containers with friction fit covers, as in FIG. 4 and FIG. 6, bulging tear-openable packages similar to sealed microwavable frozen food containers such as in FIG. 5 and FIG. 6, bottles with twist-off caps, such as shown in FIG. 6, or the products can be provided in containers for thin flat substrate sheets such as in FIG. 7 and FIG. 11, or containers for spiraled rollable sheets, as in FIG. 7, FIG. 10 and FIG. 11 and packages for cutting edged multi-unit cylinders like cookie dough cylinders, such as in FIGS. 9 and 10.

The kiosk temperature controlled baking product display sections may take different placements and configurations, such as in a single typical furniture armoire style with separate container display sections, or may be configured as indicated in FIG. 12, opposite each other, with refrigerated and freezer sections together on one side with the room temperature dry baking products section on the other side, or vice versa, or other arrangements. Located within the immediate vicinity of the container display sections of the typical display furniture, located between and to the back of the sections, is the interface computer voice and/or touch computer, as shown in FIG. 12A. It is noted that the arrangement of the three sections can be varied, and each temperature controlled section can have one or more shelving sub-components.

For example, associated with the kiosk is a computer interactive touch or voice activated input screen and an output display screen (as shown in FIG. 12A) which allows the home baker to acquire all the information for ingredients needed and the instruction for baking the cake. Visually displayed on a screen, downloadable over the Internet to a P.C. or personal hand held electronic Internet-enabled device and sent to the customer's e-mail, to a cell phone, a smart phone, with or without "Apps", are audio and/or visual recorded instructions viewable on either the viewing screen or audio output of the baking customer's personal handheld electronic device and/or on a physical paper print out form dispensed from a printer at the kiosk. The kiosk can also refer the customer to the Baking Company's website for remote access by the customer.

Description of Products:

The following examples are of typical baking products associated with the baking company and its website:

Batter Cake

Introducing Pour and Bake, Cake Batter:

The idea is to have ready-made cake batter premixed to the exact consistency required for baking, pour in cake pan and bake, so that the home baking customer bakes a cake which has the taste and organoleptic sensory properties (taste, touch and smell) of the baking company's proprietary retail sold baked goods, which are also sold at the supermarket or other retail food establishment. There can be different sizes of cake pan, standard loaf pan, round pan, oval pan, square pan and rectangle pan.

There are several varieties of cake batter, typically, yellow, white and chocolate. These include:

Basic cake batter
Plain cake
Loaf cake
Pound cake batter
Butter cake batter
Sour pound cake
Banana cake
Lemon cake
For rum cakes add pre-measured rum flavor.
For vodka cakes add pre-measured vodka flavor.
For whiskey cake add pre-measured whisky flavor.
For cider cake add per-measured cider flavor The flavors are not limited to only these flavors but all liqueurs as per the prescribed portioned.

Other varieties of cake batter include:
Angle cake batter
White cake batter
Chocolate cake batter
Devil's food cake batter
Black forest cake batter
German chocolate cake batter
Brownie cake batter
Carrot cake batter
Vanilla cake batter
Pineapple cake batter
Cheese cake batter
Yogurt cake batter
Orange cake batter
Donut cake batter
Muffin cake batter All above cake batter can be used for cup cake baking.

The kiosk can instruct customers about adding tangible baking elements in specific baking instructions, such as for cherry cake to add glazed cherries to batter, for chocolate chip cake to add chocolate chips to batter, for peanut cake to add peanut chips to batter and for raisin cake to add raisins to batter, or to add pre baking toppings, sugar crumbs, nuts, post baking toppings, such as frosting, icing, fondant, glaze and/or honey glaze.

The kiosk can also provide information to the customer about adding fillings for layer cake, (where cakes are cut horizontally), including fillings such as raspberry preserve, cherries in syrup, crushed pineapple in syrup. apricot preserve, lemon preserve and apple, which are typical fillings, or about adding other toppings, such as confectioners' powdered sugar.

In general the home baker can mix and match the ingredients to suit their own individual tastes.

Danish Pastry Cake

Danish pastry dough is very difficult to make for home bakers. The layering of dough and butter, the constant folding and rolling out refolding and rolling out is tedious time consuming and to say the lease tiring.

In addition the dough has to be proofed, retarded (refrigerated for up to 12 hours) which is not always practical for most home bakers.

The idea is to provide commercial Danish pastry dough ready to use.

The ready to use dough would tough out, be allowed to rise and to rest before being baked.

With standard Danish pastry plain cake, dough is rolled out, shaped by hand and baked, and glazed if desired. Then the product is sprinkled with nuts walnut, almonds, apple chips or the user's favorite topping. Glaze when baked.

For cherry filled Danish pastry, the user is instructed by the kiosk computer to roll out the Danish pastry dough, sprinkle cherries as desired, fold, shape and bake, and glaze if desired.

For cheese filled Danish pastry, the user is instructed by the kiosk computer to roll out spread cheese fold, shape and bake, add sprinkled powder sugar, when baked.

For pineapple filled Danish pastry, the user is instructed by the kiosk computer to roll out dough, spread crushed pineapple, fold shape and bake For cherry cheese Danish pastry, the user is instructed by the kiosk computer to roll out dough spread cherries, fold spread cheese, fold over shape and bake.

For filled Danish pastry dough, filbert, fruit mince, candy peel, etc., the user is instructed by the kiosk computer to roll out fold as desired, shape and bake, and glaze when baked.

For additional flavors, the user is instructed by the kiosk computer to sprinkle alcohol or non alcoholic liqueurs spread over baked cake, as per the user's preference.

The new range of ready to use home cake baking products are prominently displayed in the aforementioned in-store kiosk region, having the aforementioned three separate temperature controlled display containers displays shown in FIG. 12, for room temperature dry goods, for refrigerated goods at less than 40 degrees F. and for frozen components at about 20° F. to about minus 15 degrees F.

The baking company's logo is clearly displayed above the kiosk, so that the home baking customer can associate the baking company's pre-packaged quality baking goods with the set of home baking components. The home baking customer, who may be fond of a certain favorite baking product of the baking company, can use the kiosk display as a one stop shopping for the customer looking for all the products required for home cake baking of the customer's favorite product or selected other products, wherein the home baking customer is reminded by the baking company's logo to coordinate the purchase of pre-selected packages of baking components for home baking use with minimal direction needed. This is advantageous for multi-tasking home baking customers who don't have the time or inclination to figure out how to bake a cake or other baking product from raw ingredients without extensive study and time involved. It makes it easy and quick for the home baking customer to have all the needed packaged ingredients with baking step and temperature requirements, so that the home baking customer can efficiently juggle the home baking customer's busy daily schedule and still make quality home baked goods reminiscent of the baking company's logo and product line of otherwise pre-packaged baking goods.

Incorporated in the center of the kiosk and between the sections is a computer input screen (see FIGS. 12A and 14) for interaction with the consumers in the kiosk display which includes the aforementioned three temperature shelving displays sections, shown in FIG. 12 as follows:

1) dry goods section; requiring room temperature, including of cakes mixes, toppings, icing, dry fruit nuts and other similar items.

2) refrigerated section at 40 degrees F., for items requiring refrigeration, such as pour and bake batter and other refrigerated liquid items.

3) freezer section at about 20° F. to about minus 15°, for items requiring to be frozen, such as dough and certain liquids The kiosk furniture shelving display lay out is typical, as shown in FIG. 12, with a center section with two side sections slight angle forward or a similar typical arraignments that facilitate the customer one stop shopping for all their baking needs.

The convenient computer kiosk section, with a touch screen or other user input computer device, output screen and/or audio output, as well as a writing shelf, is located in the kiosk, typically between the displays. Alternatively, the computer can be attached to a side of the kiosk itself (as in FIG. 12A).

Cake recipes and formulas can be downloaded from the computer located in the kiosk, or from the baking customer's hand held portable computing device. This feature allows home bakers and customers who with little knowledge or experience of baking to be provided with information, methods and recipes for home baking. For example, the computer provides step by step instructions to the customer for easy baking, what to do and how to do it. The sequence of events is described as one bakes a cake, with bake times, icing temperature, cooling time and other necessary mixing steps.

The kiosk also provides new products, such as:
1) the introduction of pour and bake cake batter packaging, 2) the introduction of frozen roll out icing fondant, marzipan and toppings, and 3) the introduction of frozen Danish pastry dough.

Moreover, the kiosk can store and vend the customer's requested baking constituent components in the desired quantities to the customer for immediate or later pick up, or can deliver the customer's order to a remote location, such as the customer's home. A product selection and moving device, such as disclosed in U.S. Pat. No. 6,962,267 of Herzog, can be used for locating the requested product, moving it from the product display cabinets, and transporting them for vending to the customer, either by pickup at the store, or for shipment and delivery to a remote site, such as to the customer's home.

In an alternate embodiment, the present invention includes a food supermarket display cabinet system including a rear cabinet structure with first and second side cabinet structures extending out from the rear cabinet structure forming a partially enclosed furniture kiosk in or adjacent an aisle of the supermarket. A logo identifying a baking company is prominently displayed on the cabinet structure. The cabinet structures contain a combination of open room temperature shelving, enclosed transparent refrigerated shelving and enclosed transparent freezer shelving for frozen ingredients;

The cabinet shelving also contains pre-packaged baking constituents for a number of different baking products; and baking constituents for each baking product, which are physically located in one or more of the open room temperature shelving, refrigerated shelving, and freezer shelving.

In an example, one or more of the cabinet structures may optionally contain open room temperature shelving, and one of the cabinet structures may optionally contain both refrigerated and freezer shelving.

Preferably, the furniture display cabinet system contains visual indicia of a baking manufacturer, wherein the visual indicia identifies commercially packaged baked goods and instructions to customers how to bake equivalent baking products at home by using the prepackaged baking constituents at home. The cabinet structure may preferably include printed instructions for baking a particular product at home. Each of the separate packaged baking constituents is provided in pre-measured, prepackaged amounts required for a selected particular baking cake product. The display cabinet system also preferably includes shelving which has coordinated shelving displays for the different packages of baking constituents under the baking company's logo.

The packaging of the baking constituents includes at least one sealed pour and bake gabled, peaked top operable boxed shaped parallelepiped container; and at least one other sealed, food package display storage packaging baking constituent container.

Preferably the furniture display cabinet system has a user-retrievable composite set of printed instructions providing a customer user with price and/or quantity information, along with cooking instructions. The printed instructions are dispensed manually from a composite set of specific user-retrievable printed instructions, such as from a tear-off assembly of instruction sheets or from a sub-shelving with multiple user retrievable instruction sheets.

Optionally a specific user-retrievable printed instructions are dispensed from a user operable printer in the furniture cabinet system.

Optionally also, at least one pre-packaged container is selected from the group consisting of a parallelepiped box shaped container, a container with a peel-off top, a container with a tearable pouch, a capped bottle, a container accommodating a rolled sheet of baking constituents, a tubular container and a plurality with incrementally detachable units of baking dough.

Also optionally, the furniture cabinet display system may contain an interface for a user to make a selection of a particular baking cake product and make payment for separately packaged constituents for the selected baking cake product and instructions for the selected baking cake product, wherein the interface is an electronic device via the Internet or an in-store wireless communications system, and wherein the instructions are delivered to the electronic device and provide the customer with information as to whether the constituents are available. In this embodiment, the furniture display system optionally includes a central controller to initiate an electronic message to a baking company server to receive instructions for home baking a particular baking cake product if instructions therefore are found not to be present in local memory accessible to the kiosk central controller.

BRIEF DESCRIPTION OF THE DRAWINGS

The present invention can best be understood in connection with the accompanying drawings. It is noted that the invention is not limited to the precise embodiments shown in drawings, in which:

FIG. 7 is a perspective view which shows tangible roll out icing toppings single and double sheets cake glazing pouch and boxes;

FIG. 8 is a perspective view which shows tangible pre-sized flat sheets of icing toppings for place and bake;

FIG. 9 is a perspective view which shows a tangible roll of chocolate wafers pre-sized to place on top of cookies;

DETAILED DESCRIPTION OF THE PREFERRED EMBODIMENTS

The main idea of this home baking kit with retail store and baking company interface is to show people who have limited knowledge, experience or baking background how to bake at home great tasting professional style cakes associated with a baking company at home.

Figure 1:
FIG. 1 is a front view which shows the baking company's logo, with a depiction of the range of home baking products.
Figure 2:
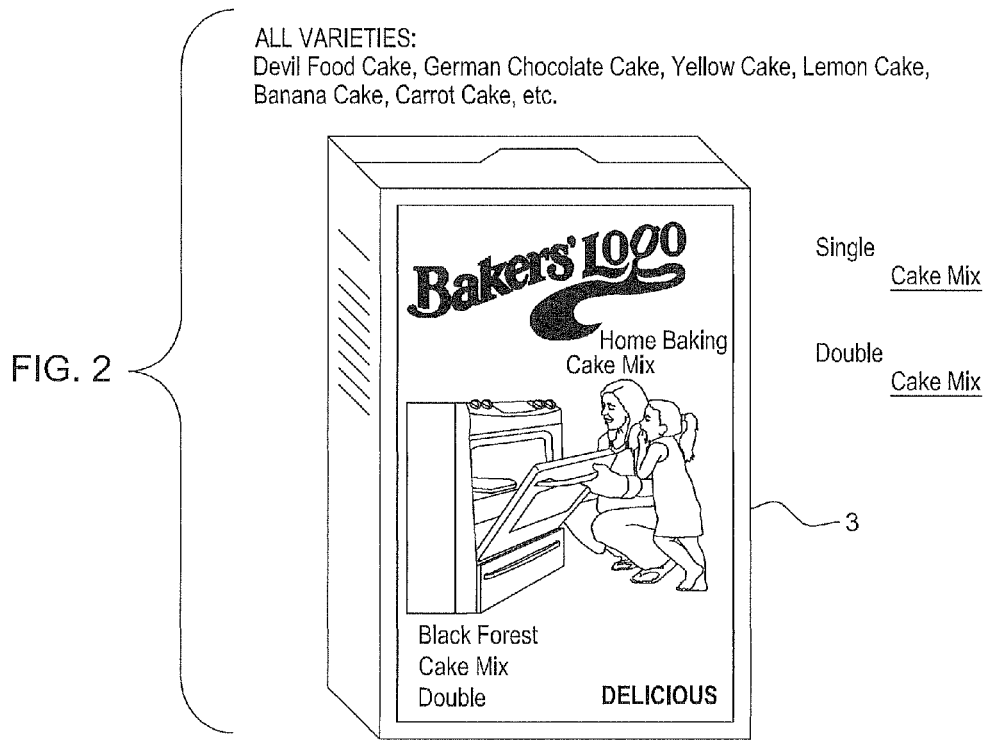
FIG. 2 is a perspective view which shows ready to use cake mixes.
Figure 3:
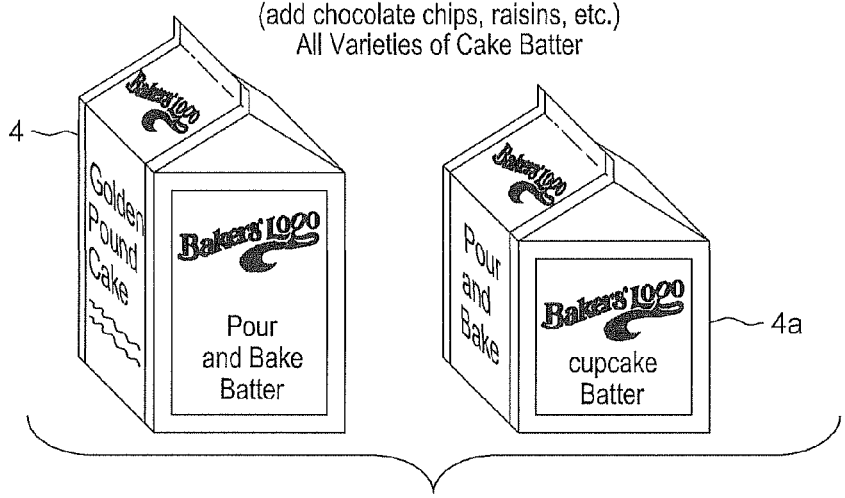
FIG. 3 is a perspective view which shows the pour and batter in typical tangible pre-sized containers.
Figure 4:
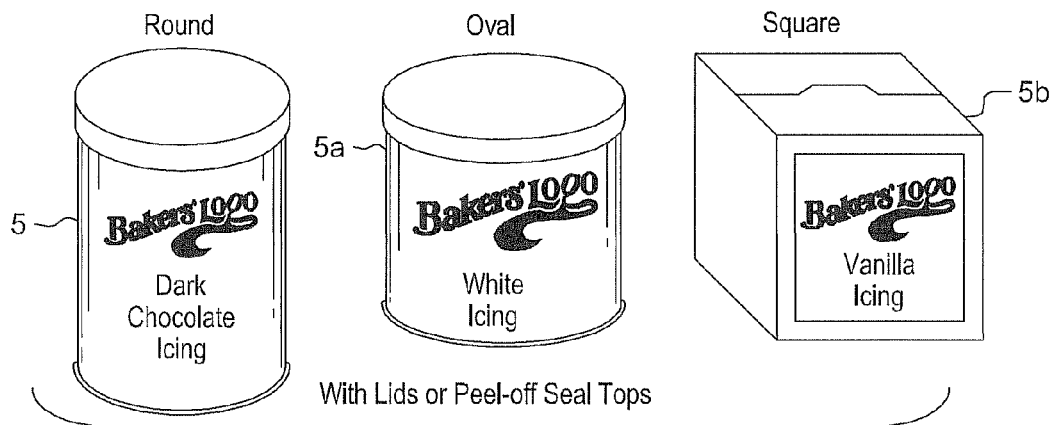
FIG. 4 is a perspective view which shows varieties of icing, fondant, etc., in typical sealed containers.
Figure 5:
FIG. 5 is a perspective view which shows a convenient tear-openable pouch containing icing for dribbling on top of cakes.
Figure 6:
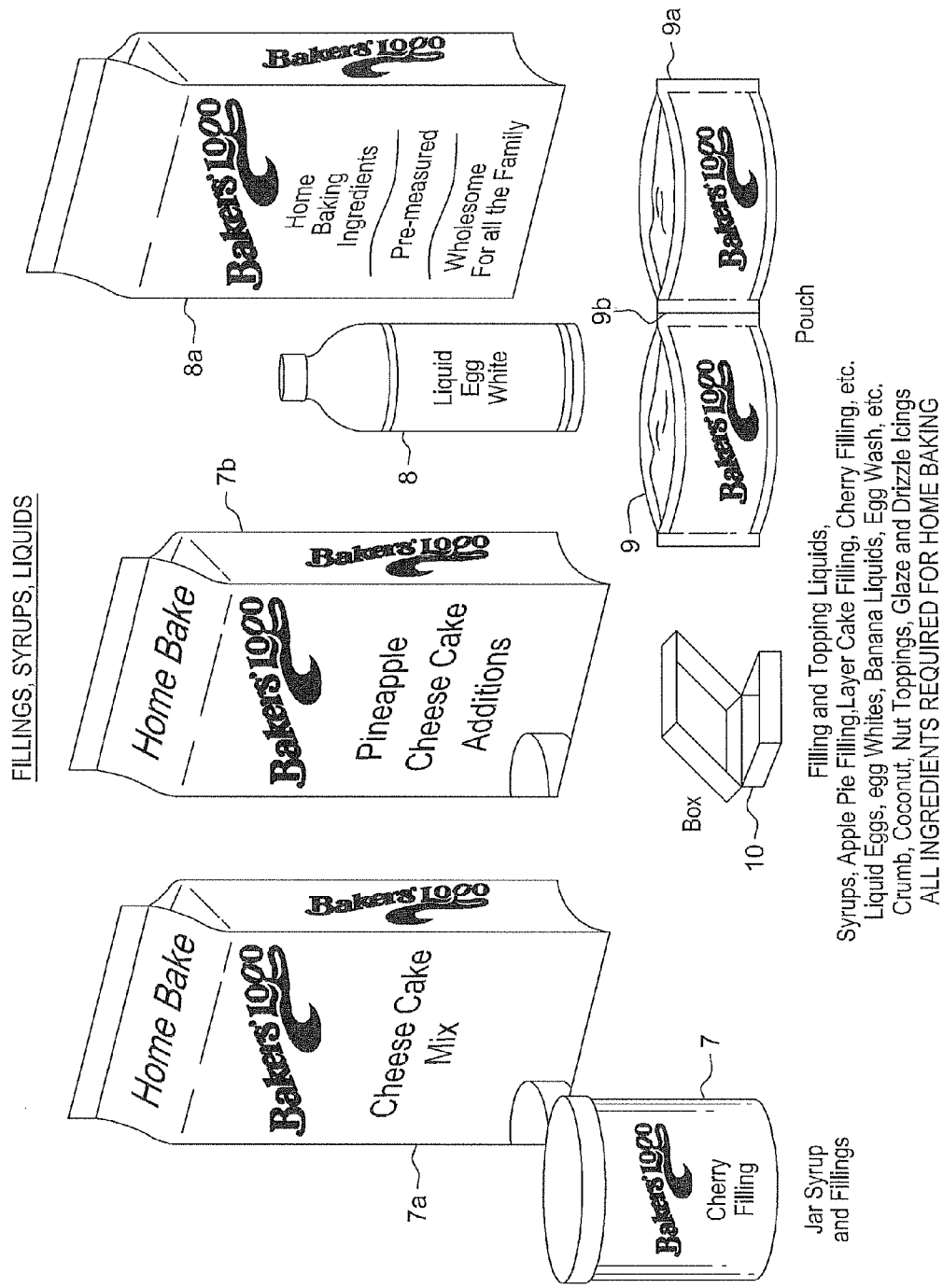
FIG. 6 is a perspective view which shows typical tangible cake containers for a variety of baking ingredients, such as cake batter, fillings, mixes, liquid egg wash, icing and topping pouches and topping sealed boxes.
Figure 10:
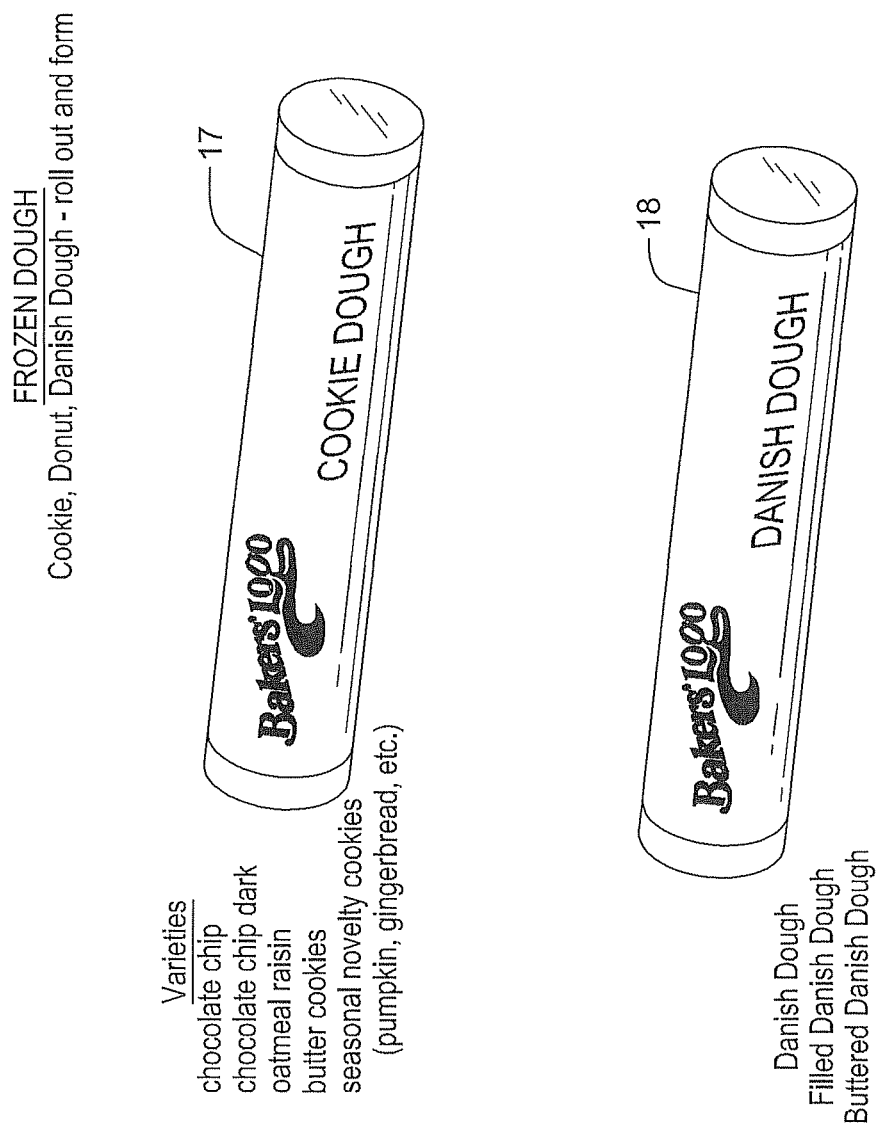
FIG. 10 is a perspective view which shows frozen Danish pastry dough typical containers.
Figure 11:
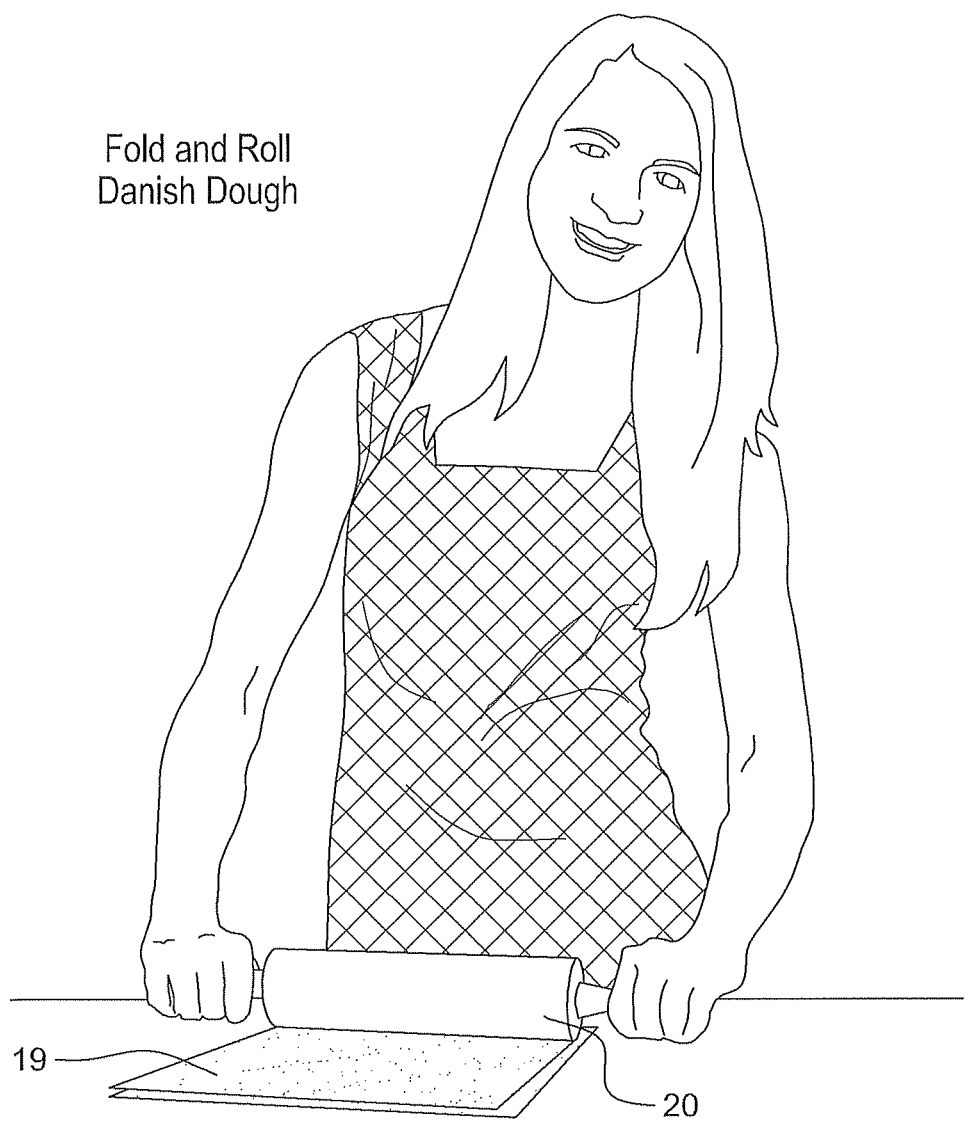
FIG. 11 is a perspective view which shows a home baker customer rolling out dough.

FIG. 1 shows a baking company's logo 1 displayed with a set of containers with measured proportioned baking ingredients for a range of products used in baking products at home. Cake mix box 3 is shown in FIG. 2. Liquid cake batter containers 4 and 4a are shown in FIG. 3. Icing/fondant tubs 5, 5a and 5b are shown in FIG. 4. Peel openable pouches 6 for icing or other viscous pourable components are shown in FIG. 5. Cake ready mixed flavors mixes are shown in FIG. 6 including syrup filling jars 7, liquid mix containers 7a for products such as cheesecake, 7b for pineapple cheesecake, or bottles 8 of liquid components, such as egg whites used with pre-measured liquid baking components in a container 8a. Dual tear off pouches 9, 9a are joined by a tear-openable connector strip 9 band storage boxes 10 for the baked product are also shown in FIG. 6. FIG. 7 shows pre-measured icing sheets, such as double rolled icing sheet 11 or single rolled icing sheet 12 (provided in boxes 13). FIG. 8 shows the home installation of a sheet of icing 12 upon cake 14. FIG. 8 also shows a disc-shaped icing sheet 15 with a center hole 15a for placing upon a hollow Bundt cake or Angel food cake Miniature chocolate icing wafers 16 for placement upon baked cookies are shown in FIG. 9. Rolls of cookie dough 17 and Danish pastry dough 18 are shown in FIG. 10 in the exact weight and size required for the selected cake. These rolled cookie and pastry doughs can be folded and/or rolled into flat sheets 19, by a rolling pin 20 shown in FIG. 11.

Figure 12:
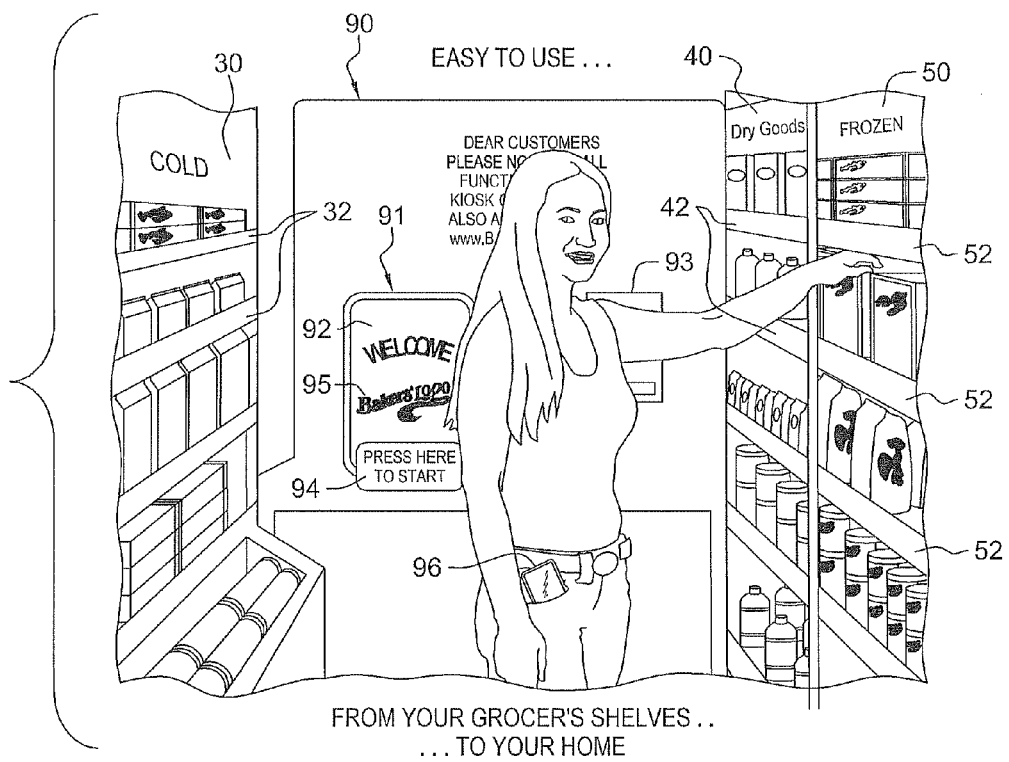
FIG. 12 is a perspective view which shows a baking company kiosk with a typical product component display furniture.
Figure 12A:
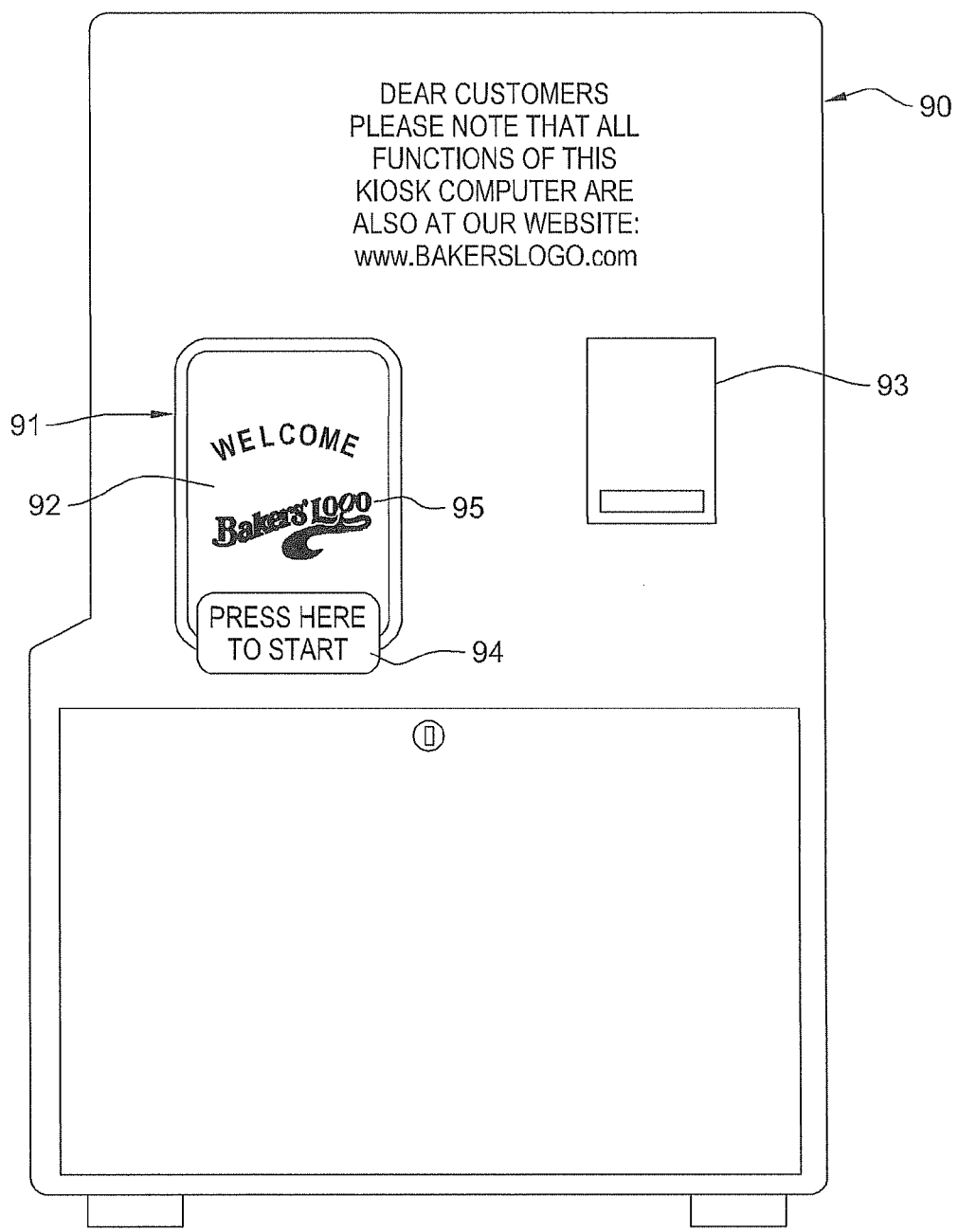
FIG. 12A is an elevational view which shows a front end view of a kiosk computer attached to the end of a kiosk with a touch screen interface for customer use.

As shown in FIGS. 12 and 12A, the kiosk baking computer 91 with a touch screen 94 and/or other input, such as a keyboard or voice activation, interacts via its own output displays with a home baking customer, or alternatively, with the customers own smart phone 96 or other handheld electronic device having special Internet enabled "Apps" therein communicating with the baking company's website 95 displayed on screen 92 of kiosk 90. Either of these options enable the customer to select what type of baking product the customer requires, either from the instructions and/or displays on the kiosk computer's screen 92, or on a printed paper sheet from printer 93, or in the customer own cell phone or other handheld computer's screen, as to what ingredient components are needed to select from the three temperature controlled associated display cabinets and how they are to be mixed and baked by the baking company's customer. Display cabinets include ambient air temperature dry goods' cabinet 30 with shelves 32, cold goods cabinet 40 with shelves 42 and frozen cabinet 50 with shelves 52 for frozen goods. Associated with these displays is kiosk 90 providing information to the home baking customer, who is reminded of the baking company's goodwill and reputation via its prominently displayed logo 1, insuring quality control of the products 2 sold to the customer.

Figure 12B:
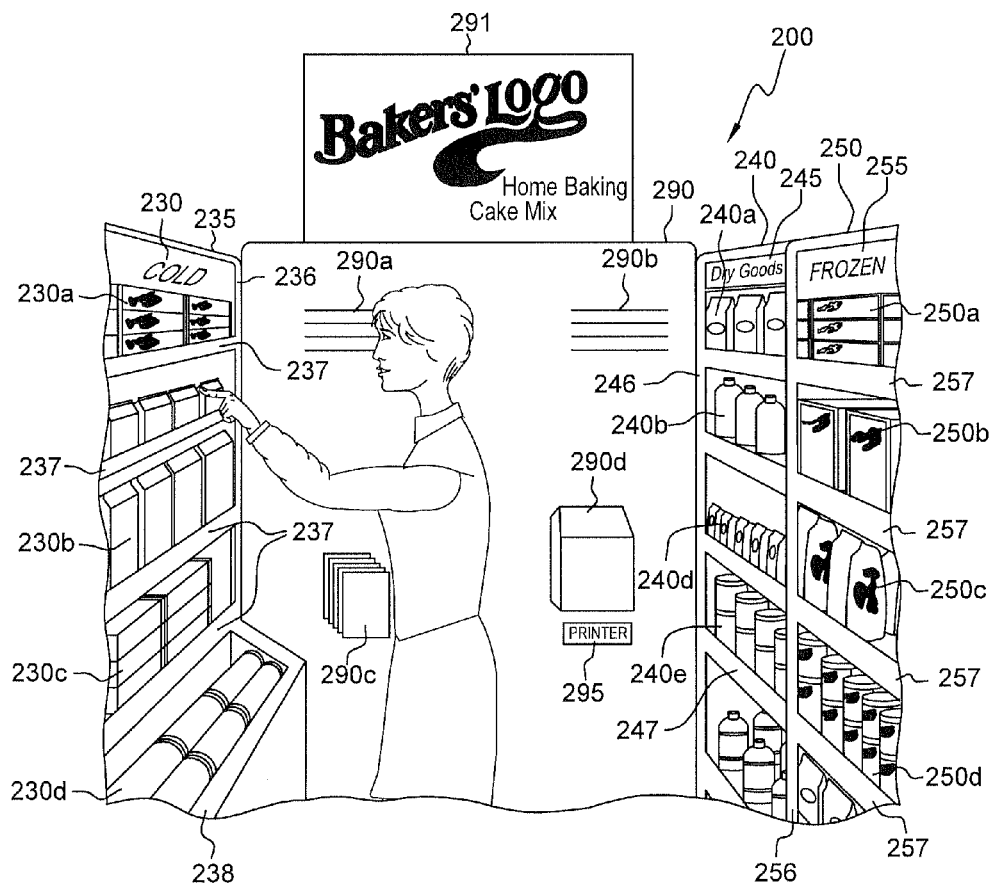
FIG. 12B is a perspective view of a furniture display system, having three temperature controlled sections, connected by a wall having printed instructions printed thereon or available in printed user retrievable sheets for home use.
Figure 12C:
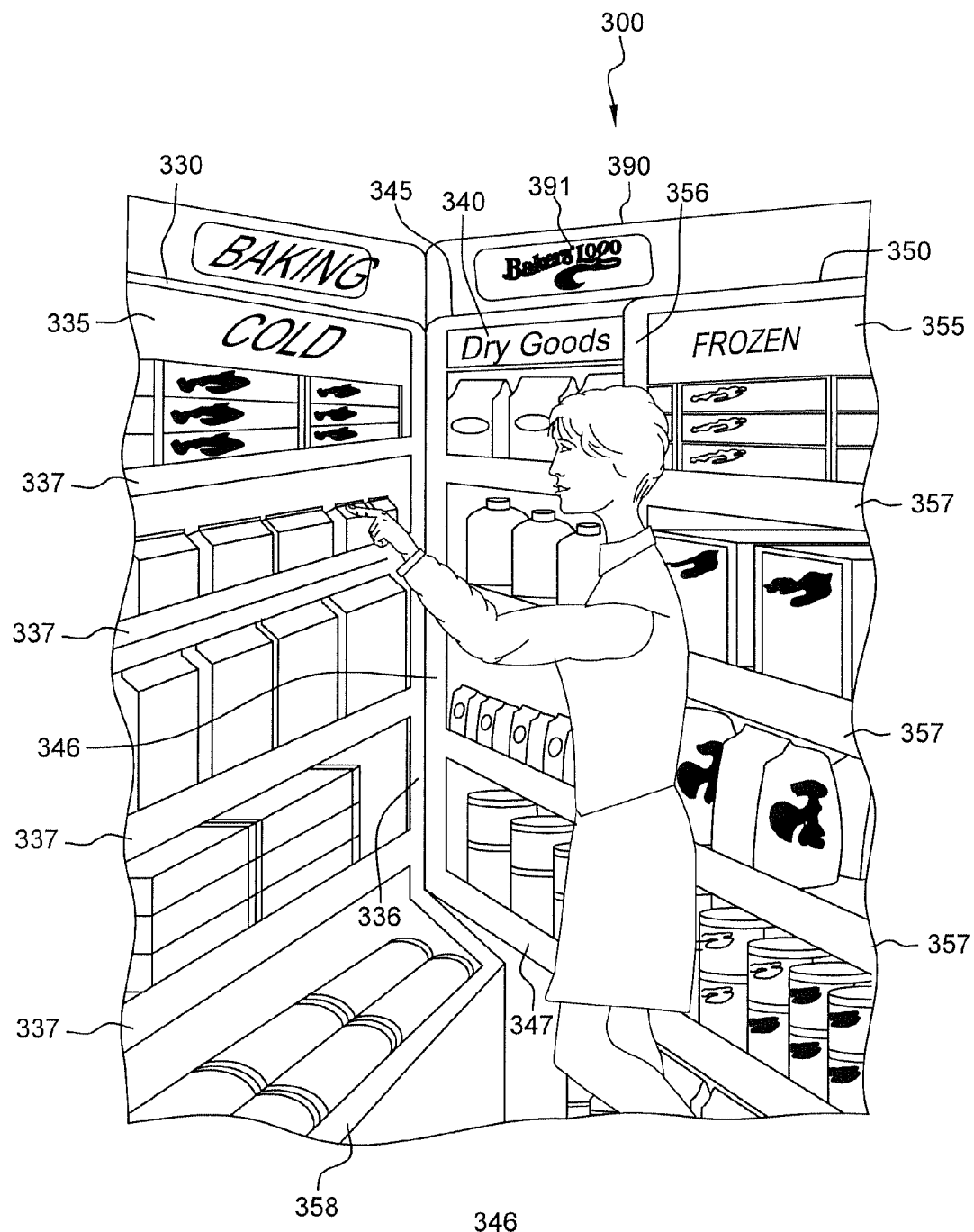
FIG. 12C is a perspective view of an alternate embodiment for a furniture display system with three temperature controlled sections connected to each other, with a baking company logo prominently displayed thereon.

In an alternate embodiment shown in FIGS. 12B and 12C, the present invention includes a food supermarket display cabinet system 200 and 300 respectively. In FIG. 12B there is shown a rear cabinet structure 290 with first, second and third side cabinet structures 230, 240, 250 extending out from the rear cabinet structure 290 forming a partially enclosed furniture display shelving system 200 in or adjacent an aisle of the supermarket. A logo 291 identifying a baking company is prominently displayed on the cabinet structure 200, preferably on or above a central panel 290 having printed instructions 290a, 290b, user retrievable coupons 290c and user retrievable instruction sheets 290d for baking selected baking products from the packages of constituents, which include temperature controlled refrigerated packages 230a, 230b, 230c and 230d from refrigerated shelving section 230, room temperature dry goods packages 240a, 240b, 240c and 240d from dry goods shelving section 240, as well as optionally frozen packages 250a, 250b, 250c and 250d from frozen cabinet section 250. The cabinet structures contain a combination of open room temperature shelving 240, enclosed transparent refrigerated shelving 230 and enclosed transparent freezer shelving 250 for frozen ingredients.

In FIG. 12B, each cabinet shelving section 230, 240 and 250 of furniture cabinet kiosk 200 is connected directly, or indirectly, to an instructional connecting panel 290 located between two of the three shelving sections. While FIG. 12B shows instructional connecting panel 290 between refrigerated cold shelving section 230 and room temperature dry goods shelving section 240, which in turn, is connected to frozen shelving section 250, it is noted that instructional connecting panel 290 can be located between any two of the shelving sections 230, 240 and 250, and the shelving sections can be juxtaposed in any sequential order from left to right, or right to left.

In the alternate embodiment of FIG. 12C, the three cabinet shelving sections 330, 340 and 250 of furniture cabinet kiosk 300 are shown connected to each other sequentially, without the presence of an instructional connecting panel, such as panel 290 of FIG. 12B.

Moreover, each cabinet shelving section 230, 240, 250 of FIG. 12B or each cabinet shelving section 330, 340, 250 of FIG. 12C contains an outer frame including a top cap 235, 245, 255 in FIG. 12B or 335, 345, 355 in FIG. 12C, as well as side and rear vertical frame panels 236, 246, 256 of FIG. 12B or side and rear vertical frame panels 336, 346, 356 of FIG. 12C, supporting a plurality of horizontal shelving panels 237, 247, 257 of FIG. 12B or a plurality of horizontal shelving panels 337, 347, 357 of FIG. 12C. Optional bins 238 in FIG. 12B or bins 358 in FIG. 12C may be provided for tubular packaging which are more readily stored and retrievable when laid horizontally, as opposed to standing erect on shelves above the bins 238 or 358, such as for displaying tubular rolls with cookie dough or cinnamon roll dough for purchase.

The cabinet shelving contains pre-packaged baking constituents for a number of different baking products; and baking constituents for each baking product, which are physically located in one or more of the open room temperature shelving 240, refrigerated shelving 230, and freezer shelving 250.

In another example shown in FIG. 12C, one or more of the cabinet structures 300 may optionally contain a joined together assembly of open room temperature shelving 340, connected directly by joints to both refrigerated shelving 330 and freezer shelving 350, in any arrangement thereof.

Preferably, the furniture display cabinet system contains visual logo indicia 291 or 391 of a baking manufacturer, wherein the visual indicia 291 or 391 identifies commercially packaged baked goods and instructions 290a, 290b, 290d to customers how to bake equivalent baking products at home by using the prepackaged baking constituents at home. The cabinet structure may preferably include printed instructions 290d for baking a particular product at home. Each of the separate packaged baking constituents 230a, 230b, 230c, 230d, 240a, 240b, 240c, 240d, 250a, 250b, 250c, 250d in FIG. 12B or 330a, 330b, 330c, 330d, 340a, 340b, 340c, 340d, 350a, 350b, 350c and 350d in FIG. 12C, are provided in pre-measured, prepackaged amounts required for a selected particular baking cake product. The display cabinet system 200 or 300 therefore preferably includes shelving which has coordinated shelving displays for the different packages of baking constituents under the baking company's logo 291 or 391.

The packaging of the baking constituents includes at least one sealed pour and bake gabled, peaked top operable boxed shaped parallelepiped container; and at least one other sealed, food package display storage packaging baking constituent container.

Preferably, as shown in FIG. 12B, the furniture display cabinet system 200 has a user-retrievable composite set of printed instructions 290a, 290b, 290c and 290d providing a customer user with price and/or quantity information, along with cooking instructions. The printed instructions 290a, 290b, 290c and 290d are optionally dispensed manually from a composite set of specific user-retrievable printed instructions, such as from a tear-off assembly of instruction sheets 290c or from a sub-shelving with multiple user retrievable instruction sheets 290d. Optionally the instructions may include coupons.

Optionally a specific user-retrievable printed instructions are dispensed from a user operable printer 295 in the furniture cabinet system 200 or 300.

Optionally also, at least one pre-packaged container is selected from the group consisting of a parallelepiped box shaped container, a container with a peel-off top, a container with a tearable pouch, a capped bottle, a container accommodating a rolled sheet of baking constituents, a tubular container and a plurality with incrementally detachable units of baking dough, as shown also in FIGS. 3-10 herein.

Figure 13:
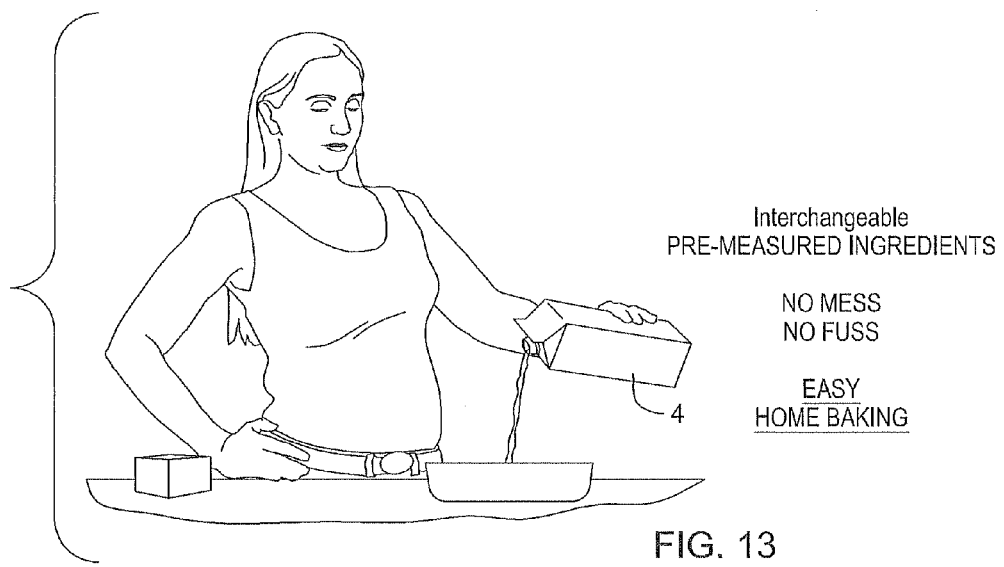
FIG. 13 is a perspective view which shows a home baker customer pouring the pour and bake batter into a baking pan for home baking.

As shown in FIG. 13, home cake baking enables the home baking customer to purchase the ingredients and prepare the ingredients at home. Therefore, the kiosk 90's computer 91 and visual and/or audio displays 92, 93 instruct the customer that one must know the quantity of each of the ingredients, the sequence of mixing and blending which of the ingredients, and which of the ingredients to add and when the time required for these activities etc. (the baking time and temperature.) must also be known to the customer in order to prepare the baking product at home, as shown in FIG. 13.

The home baking customer's handheld smart phone 96 or other hand held electronic device with "Apps" and associated software and kiosk displays 92, 93 can, therefore, instruct the customer in how to mix the components simply and bake the desired baking product.

The computer interface with the baking company's computer 91 at kiosk 90, and associated website 95, provide the information of what ingredients, weight and size are required. The computer 91 and website 95 displayed on computer screen 92 also provide the item cost; and the screen also shows visually how to combine and when to combine the ingredients. The baking computer also provides the customer with information on bake times and temperatures, All information is accessed from the baking company computer 91 at kiosk 90, via visual display on screen 92 and/or audio voice output with voice and touch activation, print outs from printer 93, which are downloaded to the customer's laptop, cell phone 96 or any other device having "Apps" capacity, to communicate with the kiosk's 90 interactive computer 91.

Figure 14:
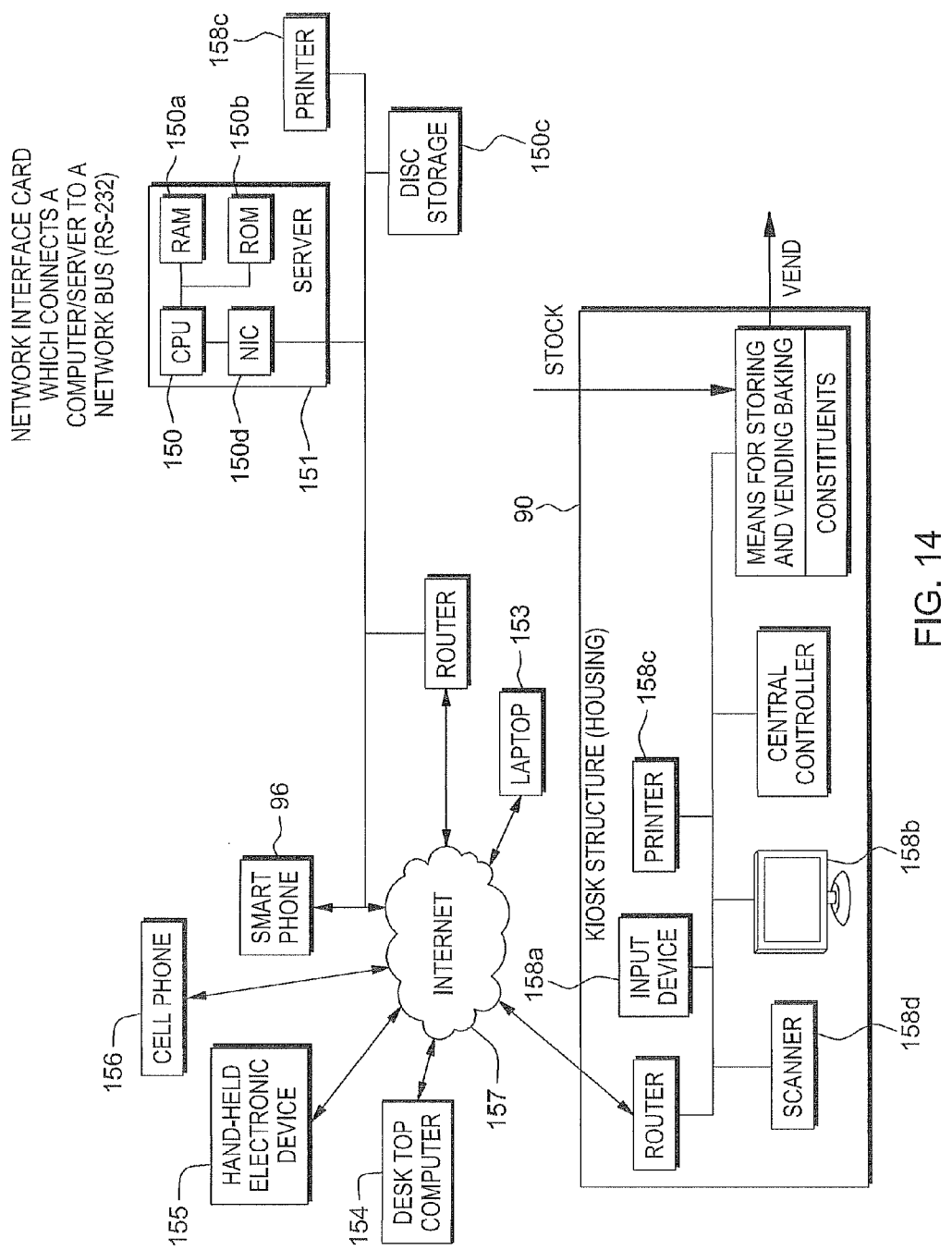
FIG. 14 is a computer and Internet system diagram view, which shows the baking company's central processing unit, referred to as the baking computer, with a server, Internet and the typical communications that the home baking customer may interface and use with; and, FIG. 15 is a flowchart of customer interaction with the kiosk computer interface of this invention.
Figure 15:
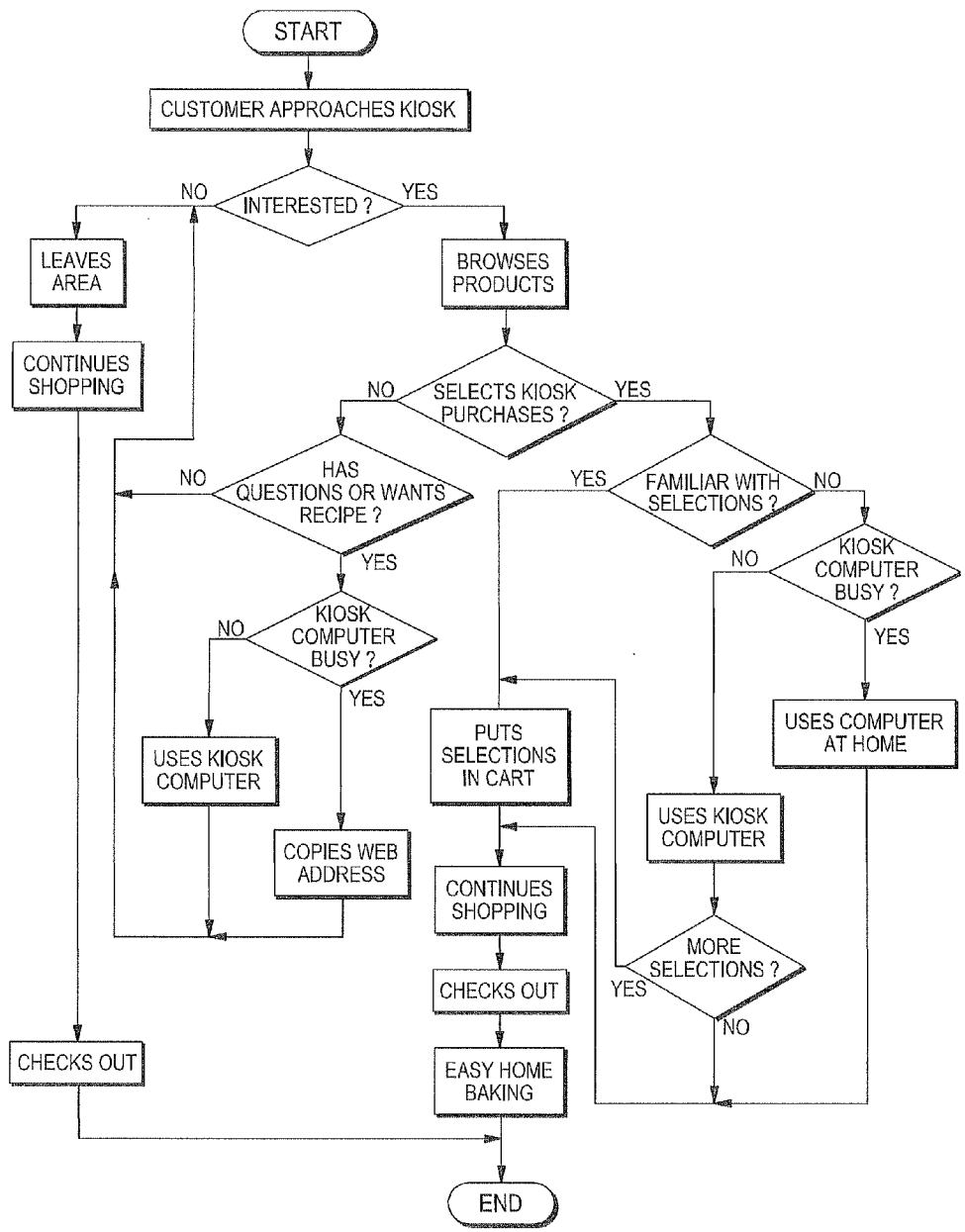

An additional feature shown in FIGS. 14-15, is the ability, with the baking company's authority and permission, of accessing this information from the baking company's Central processing unit connected to the baking company's website 95, to the user's home P.C. computer or hand held Internet-enabled computing device, such as smart phone 96 for home use, while baking the pre-selected baking product at the customer's home, with in-store purchase of the products or with remote shopping, vending and delivery of the products through a store delivery service, such as, for example, "PeaPod®."

The subject matter of this invention is therefore the embodiment of home baking with computer interaction, at the in store kiosk 90 and/or remotely with the home baker, through a smart phone 96 or home computer, such as a laptop or PC personal computer. The kiosk 90 introduces and facilitates the interaction between the customer and cake baking over the Internet, iPod, smart phone 96, tablet, or other type wireless devices, in accordance with the following description of the computer system associated with the kiosk.

Computer System for Interchangeable Retail Store Component Home Baking Kit:

As shown in FIGS. 14 and 15, a baking company has a computer-based system 91 associated with company website 95 and the Internet, which is shown in FIGS. 12, 12A, 14 and 15 herein, by which the inventive method or application program implemented by the interchangeable retail store component home baking kit may be carried out. The baking company operates a computer readable interchangeable retail store component home baking kiosk 90 with the computer-based system 91, which, as shown in FIG. 14, includes a central processing unit 150, which houses a processor, and other systems components (not shown expressly in the drawing figure) that implement a general purpose processing system, or computer that may execute a computer program product. The central processing unit 150 includes both Random Access Memory (RAM) 150a and Read Only Memory (ROM) 150b and other software through a server 151. The computer program product 91 may comprise media, for example a compact storage medium such as a compact disc in the kiosk 90 with an input device 158a, such as shown in FIGS. 12 and 12A, for example, a touch screen 92, keyboard input, mouse or voice activated input 158a and visual and/or audio/visual display 158b in a retail establishment or it may comprise wireless media from the Internet 157 communicating with a server 151 communicating with the baking company's central Processing unit 150 of their computer systems 91, wherein the media readable by a store customer having a handheld personal electronic device, such as a smart phone 96, laptop, desk top computer 154, handheld electronic device 155 (such as a tablet pad) or cell phone 156, each having Internet access and an installed application (i.e. "App"), which may be read by the processing unit 150 through a disc drive or network interface card 150d, or by any means known to the skilled artisan for providing the computer program product to the general purpose processing system for use in the computer system for the interchangeable retail store component home baking kit thereby. For example, the network interface card 150d connects computer/server 151 to a network bus (RS-232).

The computer program product comprises all the respective features enabling the implementation of the inventive method for the interchangeable retail store component home baking kit described herein, and which—when loaded in a computer system 91 of kiosk 90 communicating directly or remotely with the baking company's computer 91 through website 95 over the Internet 157—is able to carry out the computer system 91 for the customer's implementation of the interchangeable retail store component home baking kit.

It is further noted that "computer program", "software program", "program", or "software", in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product 91 at the kiosk 90 for the interchangeable retail store component home baking kit of the baking company, through its website 95, may be stored on hard disk drives within processing unit 150, as mentioned, or may be located on a remote system such as a server 151 communicating through the Internet 157 with other remote processing units such as kiosk 90 or Internet-capable user operable devices, such as portable electronic devices 96, 153, 154, 155 and/or 156 of retail customers. These may include, among other devices known to those skilled in the computer arts, devices, such as smart phones 96, laptops 153, computers 154, other handheld electronic devices 155, such as a tablet pads, or cell phones 156 coupled to processing unit 150 of computer 91, via a network interface of the Internet 157 such as an Ethernet interface or other compatible device. The kiosk's input 158a, such as a keyboard or touch screen 94 or voice activated system, mouse and/or keyboard are either coupled to the processing unit 150 of the baking company's computer system 91, or via the Internet 157 through server 151, to provide user interaction for the computer system for interchangeable retail store component home baking kit. A display monitor of input 158a of kiosk 90 may also be used with a large screen or remote screen on the customer's Internet enabled devices for PowerPoint® presentations educating the customers prior to and during use of the computer system for the interchangeable retail store component home baking kit. An output device 93, such as a printer 158c and scanner 158d are provided at kiosk 90 for document input and output associated with the interchangeable retail store component home baking kit, such as for price comparison and/or display by either the customer using kiosk 90 or the customer's own Internet enabled handheld and other devices 96, 153, 154, 155 and 156. Display 93, such as printer 158c, is shown coupled to in store kiosk 90 communicating with the Internet 157, or directly to a network connection communicating directly with the baking company's central processing unit 150 via the baking company's website 95, but may be coupled directly to the processing unit 150 of computer 91 of the baking company's kiosk 90. Scanner 158d is shown coupled to the in store kiosk 90 directly, but it should be understood that peripherals might be network coupled, or direct coupled without affecting the ability of the processing unit 150 to perform the computer 91 system's functions for interchangeable retail store component home baking kit processes and method of the invention.

In use, the baking company provides an interchangeable retail store component home baking kit, whereby selected baking products are provided in ingredient components, at a supermarket or other food sale establishment, in a single designated display site such as shown in FIG. 12, with various temperature controlled retail shelving 30, 32, 40, 42, and 50,52 or clustered areas, in the categories of dry goods sold at room temperature upon shelves 32 of display cabinet 30, refrigerated good sold in refrigerated conditions (i.e. about 40 degrees F.) upon shelves 42 of cabinet 40, and frozen goods sold in frozen conditions (i.e. below about 20° F. to about minus 15 degrees F.) upon shelves 52 of cabinet 50. The retail customer will use the computer system 91 of kiosk 90 for an interchangeable retail store component home baking kit to determine what quantities of which of the three temperature related components are required for the desired baking product. The customer can download the list and quantity of the baking components for the desired baking product from a nearby kiosk 90 at the single designated display site, or from the customer's own handheld personal electronics device, such as a smart phone 96, laptop 153, computer 154, handheld electronic device 155 or tablet pad or other Internet enabled device cell phone 156, having an application (i.e. "App") therein communicating with the baking company's via a website 95 or retail establishment's website or local area network (LAN).

FIG. 12A shows the front end view of a kiosk 90 with attached kiosk computer 91 with interactive touch screen 92 for customer use. A dedicated output, such as printer 93, for printing out recipes is also shown adjacent computer 91. This computer equipment may alternatively be on a tabletop or in any other customer accessible configuration in the vicinity of the kiosk.

While FIG. 14 shows the communication pathways among computer equipment, FIG. 15 is a flowchart of possible customer interaction with the kiosk of this invention. While the flowchart is self-explanatory, a summary of the interactions ranges from "no interest" to "some kiosk purchases" to "interaction with the kiosk computer". Note in FIG. 15 the decision block at the center of the far right, "kiosk computer busy?". If the answer is "YES" the flow chart states that the customer uses a computer "at home". If the customer was carrying a portable web accessible device such as an i-Phone® or an i-Pad® when encountering a busy kiosk computer 91, another alternative is to access the web through the Internet 157 inside the store. In this way, the experience would duplicate that of a "not busy" kiosk computer, and the information from web access may result in additional kiosk purchases on the same shopping trip.

It is further noted that the home baking customer may also interface remotely through the baking company's website 95, remotely ordering products and instructions from the kiosk 90, and having the products delivered by a grocery phone delivery servicing such as PeaPod®.

In a preferred embodiment a kiosk vending system that facilitates home baking, includes a kiosk structure 90 or housing for receiving and storing constituents for baking products and instructions for baking products. The kiosk structure 90 includes means for vending baking ingredient constituents in predetermined amounts in containers according to a set of instructions for baking a particular product and for vending the instructions from the kiosk 90 to the customer for in-store pick-up or at home through a delivery service, for baking the particular product at home.

This kiosk vending system has a kiosk user interface; and a kiosk central controller which is connected to the kiosk structure 90, and to the means for vending, to the kiosk user interface and to the Internet. As a result, the customer user accesses the kiosk user interface and chooses a recipe for baking a particular product at home, in response to which the instructions and constituent containers required for the particular recipe chosen by the customer, are vended by the kiosk 90 computer 91 to the user.

The kiosk user interface is preferably accessed by a user via an electronic device, such as smart phone 96 via the Internet 157, wherein the instructions are delivered to the electronic device 96 via the Internet 157. A product transport device, such as, for example, a gantry system, assembles the products from cabinets 30, 40 and 50 of kiosk 90 and the constituents are available for pickup at the kiosk location, or are remotely delivered to the customer at home.

The kiosk 90's central controller initiates a an electronic message to a baking company server to receive instructions for home baking a particular baking product if the instructions are found not to be present in local memory accessible to the kiosk central controller.

The baking company server preferably comprises a digital library curation of recipes for baking products sold by various different manufacturers and distributors of baked goods.

The various different manufacturers and distributors pay an entity, such as baking company website 95, which operates the kiosk system 91 for each recipe vended and/or for each set of constituents for a particular product vended.

CONCLUSION

The present invention, therefore, provides for people who wish to home bake, but feel that they do not have the background knowledge or experience to bake cakes, the knowledge, information, instructions and support to bake all styles and types of cake at home. While purchasing the baking products the customer can acquire all the directions, instructions and details necessary at the same time; what size and combination of the baking products needed for their particular baking needs. The present invention is applicable to all baked products, such as breads, cakes, confectionary products, fruit cakes, sweet goods, dough crusts, flavored crusts, all varieties of crumb based products, rice flour baked goods, short cake, biscuits, corn flour baked goods, soy flour baked goods, as well as advancements in developed gluten-free baked goods, or any grain or non-grain product that can be milled into flour.

The present invention fosters an increased interest in home baking clubs and home baking products, an increase in business for food stores and baking product manufacturers. The increase in products and kiosk systems described herein provides for increased employment opportunities. It enables inexperienced home bakers to achieve baking up to professional standards, and encourages experimental cake baking with a combination of ingredients that may introduce new products, tastes, and tasty low fat cake products. Through the kiosk system, it makes information about baking more accessible and facilitates the introduction of new and different types of cakes and sweet good products.

By providing both the measured, pre-proportioned ingredients sizes, this makes the combination of the ingredients simple and easy. The computer interaction provides the instructions necessary and using Apps etc. the home customer baker may follow the instructions of the baking company at home, step by step to produce baked products associated with the logo of the baking company, thereby assuring quality baked products.

This concept is not only applicable to baking cake but can be applied to bread baking, pizza making, all varieties of pies, candies, cheese making, preserving any food ingredients and to any and/or all items prepared and baked/cooked in the home.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention.

We claim:

1. A food supermarket display cabinet system, for purchase of multiple pre-measured baking components for home baking, comprising:
   a partially enclosed furniture display with first, second and third side cabinet structures arranged to form a partially enclosed kiosk in or adjacent an aisle of said supermarket for one stop shopping within said supermarket for ingredients and steps required for home baking of a baking product;
   said side cabinet structures containing refrigerated shelving, room temperature shelving, and freezer shelving adapted to allow a user to select from three different temperature associated displays for the particular constituents needed to be combined, mixed, blended and baked to prepare a selected baking product;
   said shelving containing pre-packaged baking constituents for a number of different baking products, each of said baking constituents being provided in pre-measured, prepackaged amounts required for a selected particular baking cake product provided in separate packaging;
   baking constituents for each baking product being located in one or more of the open room temperature shelving, refrigerated shelving, and freezer shelving;
   a computer mounted in said structure having a screen and apparatus for inputting data to said computer for allowing said user to input a type of baking product the user desires to bake at home, said screen displaying ingredient components needed to select from the refrigerated, freezer and room temperature shelving within said kiosk, along with instructions, photographs and/or videos showing preparation of home baking products, ingredients and baking steps to home bake the selected baking product, said photographs and/or videos being downloadable to said user's hand held computer; and
   said screen displaying a baking company's website for allowing said user to access said website.

2. The display cabinet system of claim 1 in which said apparatus for inputting data to said computer includes a keyboard, voice activation or an app on a mobile device.

3. The display cabinet system of claim 2 in which said app allows instructions to appear on the user mobile device screen.

4. The display cabinet system of claim 3 in which said app gives user access to said bakery company website.

5. The display cabinet system of claim 2 in which said kiosk contains visual indicia of said baking company, said visual indicia identifying commercially packaged baked goods and instructions to customers how to bake equivalent baking products at home by using said prepackaged baking constituents at home.

6. The display cabinet system of claim 5 in which said kiosk provides printed instructions for baking a particular product at home.

7. The display cabinet system of claim 6 in which said shelving has coordinated shelving displays under said baking company's logo.

8. The display cabinet system of claim 6 in which packing of said constituents include at least one sealed pour and bake cake product gabled, peaked top operable boxed shaped parallelepiped container; and,
   at least one other sealed, food package display storage packaging baking constituent container.

9. The display cabinet system of claim 8 in which at least one pre-packaged container is selected from the group consisting of a parallelepiped box shaped container, a container with a peel-off top, a container with a tearable pouch, a capped bottle, a container accommodating a roiled sheet of baking constituents, a tubular container and a plurality with incrementally detachable units of baking dough.

10. The display cabinet system of claim 9 in which said apparatus allows said user to make payment for separately packaged constituents for the selected baking cake product and instructions for the selected baking cake product.

11. The display cabinet system of claim 10 wherein the instructions are delivered to the computer via the Internet and providing information as to whether the constituents are available in said kiosk.

12. The display cabinet system of claim 10 wherein the kiosk includes a central controller to initiate an electronic message to said baking company's server to receive instructions for home baking a particular baking cake product if instructions therefore are found not to be present in local memory accessible to the kiosk central controller.

13. The display cabinet system of claim 1 having a rear cabinet structure from which said side structures extend.

14. The display cabinet system of claim 13 in which said rear cabinet structure displays identifying information of a bakery and carries printed user instructions and user retrievable coupons.

15. A food supermarket display cabinet system, for purchase of multiple pre-measured baking components for home baking, comprising:
   a partially enclosed furniture display with first, second and third side cabinet structures, arranged to form a partially enclosed furniture display shelving system, in or adjacent an aisle of the supermarket for one stop shopping within said supermarket for ingredients and steps required for home baking of a baking product;
   a sign displaying a logo identifying a baking company being located on top of the partially enclosed furniture display;
   a central panel having printed instructions, user retrievable coupons and user retrievable instruction sheets for baking selected baking products at home from respective selected packages of baking constituents, which include:
   a) temperature controlled refrigerated packages from a transparent refrigerated cabinet structure;
   b) room temperature dry goods packages from an open room temperature dry goods cabinet structure; and,
   c) frozen packages from a transparent openable frozen cabinet structure;
   each cabinet structure having horizontal shelving panels and each cabinet structure being connected directly, or indirectly, to an instructional connecting panel located between two of said three cabinet structures;

each cabinet structure containing an outer frame including a top cap, respective side and rear vertical frame panels supporting a plurality of said horizontal shelving panels;

said cabinet structure shelving panels containing prepackaged baking constituents for a number of different baking products; and respective pre-packaged baking constituents for each identifiable baking product, which said respective pre-packaged baking constituents are physically located in one or more of said open room temperature cabinet structure, said refrigerated cabinet structure and said freezer cabinet structure;

wherein said logo identifies commercially packaged baked goods and instructions to customers on how to bake equivalent baking products at home by using said prepackaged baking constituents at home; said printed instructions providing a customer user with price and/or quantity information, along with cooking instructions;

each of said separate prepackaged baking constituents being provided in pre-measured, prepackaged containers containing amounts required for a selected particular baking cake product;

said packaging of said pre-packaged baking constituents including at least one sealed pour and bake cake product gabled, peaked top operable boxed shaped parallelepiped container; and at least one other sealed, food package display storage packaging baking constituent container;

said at least one sealed pour and bake cake product gabled, peaked top operable boxed shaped parallelepiped container; and at least one other sealed, food package display storage packaging baking constituent container being selected from the group consisting of a parallelepiped box shaped container, a container with a peel-off top, a container with a tearable pouch, a capped bottle, a container accommodating a roiled sheet of baking constituents, a tubular container and a plurality with incrementally detachable units of baking dough; and said cabinet display system providing for user access to a website of said baking company and illustrations including photographs, and/or videos showing preparation of home baking products, ingredients and baking steps, and print out directions on how to bake the requested product associated with the baking company's logo, said photographs and/or videos being downloadable to said user's hand held computer.

16. A food supermarket display cabinet system, for purchase of multiple pre-measured baking components for home baking, comprising a partially enclosed furniture display with first, second and third side cabinet structures, arranged to form a partially enclosed furniture display shelving system, in or adjacent an aisle of the supermarket for one stop shopping within said supermarket for ingredients and steps required for home baking of a baking product;

a sign displaying a logo identifying a baking company being located on top of the partially enclosed furniture display;

said cabinet system having printed instructions along with videos downloadable to user's hand held computer showing preparation of home baking products, user-retrievable coupons and user retrievable instruction sheets for baking selected baking products at home from respective selected packages of baking constituents, which include:

a) temperature controlled refrigerated packages from a transparent refrigerated cabinet structure;

b) room temperature dry goods packages from an open room temperature dry goods cabinet structure; and, c) frozen packages from a transparent operable frozen cabinet structure;

each cabinet structure having horizontal shelving panels and each cabinet structure being connected directly, or indirectly, to an at least one adjacent cabinet structure of said three cabinet structures, thereby said first, second and third cabinet structures are connected together in any orientation thereof;

each cabinet structure containing an outer frame including a top cap, respective side and rear vertical frame panels supporting a plurality of said horizontal shelving panels;

said cabinet structure shelving panels containing prepackaged baking constituents for a number of different baking products; and respective pre-packaged baking constituents for each identifiable baking product, which said respective pre-packaged baking constituents are physically located in one or more of said open room temperature cabinet structure, said refrigerated cabinet structure and said freezer cabinet structure;

said logo identifies commercially packaged baked goods and instructions to customers on how to bake equivalent baking products at home by using said prepackaged baking constituents at home; said printed instructions providing a customer user with price and/or quantity information, along with cooking instructions;

each of said separate prepackaged baking constituents being provided in pre-measured, prepackaged containers containing amounts required for a selected particular baking cake product;

said packaging of said pre-packaged baking constituents including at least one sealed pour and bake cake product gabled, peaked top operable boxed shaped parallelepiped container; and at least one other sealed, food package display storage packaging baking constituent container;

said at least one sealed pour and bake cake product gabled, peaked top operable boxed shaped parallelepiped container; and at least one other sealed, food package display storage packaging baking constituent container being selected from the group consisting of a parallelepiped box shaped container, a container with a peel-off top, a container with a tearable pouch, a capped bottle, a container accommodating a rolled sheet of baking constituents, a tubular container and a plurality with incrementally detachable units of baking dough; and said cabinet system having a computer giving a user access to said cabinet system through a mobile device.

* * * * *